United States Patent
Merello

(10) Patent No.: US 10,245,715 B2
(45) Date of Patent: Apr. 2, 2019

(54) OVERHEAD DRILL AND ANCHOR PRESS

(71) Applicant: Peter Justin Merello, Las Vegas, NV (US)

(72) Inventor: Peter Justin Merello, Las Vegas, NV (US)

( * ) Notice: Subject to any disclaimer, the term of this patent is extended or adjusted under 35 U.S.C. 154(b) by 404 days.

(21) Appl. No.: 14/884,764

(22) Filed: Dec. 28, 2015

(65) Prior Publication Data

US 2017/0182646 A1 Jun. 29, 2017

(51) Int. Cl.
| | |
|---|---|
| *B25F 3/00* | (2006.01) |
| *B25D 17/32* | (2006.01) |
| *B23B 39/14* | (2006.01) |
| *B23B 41/00* | (2006.01) |
| *B25H 1/00* | (2006.01) |

(52) U.S. Cl.
CPC ............... *B25F 3/00* (2013.01); *B23B 39/14* (2013.01); *B23B 41/00* (2013.01); *B25D 17/32* (2013.01); *B25H 1/0035* (2013.01)

(58) Field of Classification Search
CPC . B25D 2250/105; B25D 11/005; E21B 19/15; E21B 7/023; E21B 41/00; E21B 7/02; B23B 39/14; B25F 3/00
USPC ............................ 227/69; 173/2, 184, 213
See application file for complete search history.

(56) References Cited

U.S. PATENT DOCUMENTS

| | | | | |
|---|---|---|---|---|
| 2,168,905 A | * | 8/1939 | Lear ......................... | E21B 7/028 173/184 |
| 2,669,135 A | * | 2/1954 | Moore ................... | B23Q 1/267 408/128 |
| 3,399,734 A | * | 9/1968 | Folinsbee ............... | E21B 7/023 173/193 |
| 4,052,132 A | * | 10/1977 | Oates ...................... | B23B 41/14 408/1 R |
| 4,090,803 A | * | 5/1978 | Haley .................... | B23B 39/165 408/103 |
| 4,694,930 A | * | 9/1987 | Kishi ..................... | B66F 11/046 182/2.11 |
| 5,060,532 A | * | 10/1991 | Barker ..................... | B25J 9/106 74/490.01 |
| 5,803,550 A | * | 9/1998 | Watson ..................... | E21B 7/02 299/13 |
| 5,960,531 A | * | 10/1999 | Mora ..................... | B23Q 3/069 108/4 |
| 6,254,317 B1 | * | 7/2001 | Chang ................... | B23B 39/006 408/1 R |

(Continued)

Primary Examiner — Robert F Long

(57) ABSTRACT

The Overhead Drill and Anchor Press is a single mobile mechanism designed for installation of anchors into a construction surface which is overhead and out of reach of the installer. The overhead drill and anchor press is comprised of these major components: a compartmentalized cart on casters, a telescopic mast, a turret assembly, a controller, an air reservoir tank, a battery, a battery charger, and a DC power supply. The overhead drill and anchor press can execute the anchor installation sequence automatically or manually with a controller that may be hand held, or placed on the hand rail of the cart. The controller is equipped with a digital display of the turret mounted camera for monitoring the process from the ground. The entire assembly of the embodiment is designed to be manually pushed between target locations and sized to fit through standard framed door openings on a construction project.

16 Claims, 8 Drawing Sheets

(56) References Cited

U.S. PATENT DOCUMENTS

| | | | | |
|---|---|---|---|---|
| 6,315,059 | B1* | 11/2001 | Geldean | E21B 7/028 |
| | | | | 173/112 |
| 6,460,652 | B1* | 10/2002 | Piipponen | E21B 7/026 |
| | | | | 182/141 |
| 6,523,245 | B2* | 2/2003 | Whiten | B21J 15/10 |
| | | | | 227/69 |
| 7,369,916 | B2* | 5/2008 | Etter | B23B 39/00 |
| | | | | 173/2 |
| 9,327,375 | B2* | 5/2016 | Yamane | B23Q 5/04 |
| 2009/0003955 | A1* | 1/2009 | Nakagawa | B23B 39/161 |
| | | | | 409/234 |
| 2012/0247836 | A1* | 10/2012 | Wilson | E21D 20/003 |
| | | | | 175/57 |
| 2013/0228377 | A1* | 9/2013 | Kuittinen | E21B 7/025 |
| | | | | 175/57 |
| 2013/0319765 | A1* | 12/2013 | Piipponen | E21B 7/02 |
| | | | | 175/24 |
| 2014/0014609 | A1* | 1/2014 | Stakor | B66C 13/18 |
| | | | | 212/276 |
| 2014/0037415 | A1* | 2/2014 | Zuritis | E02F 3/06 |
| | | | | 414/695.5 |
| 2018/0326507 | A1* | 11/2018 | Halvorsen | B25J 9/0009 |

* cited by examiner

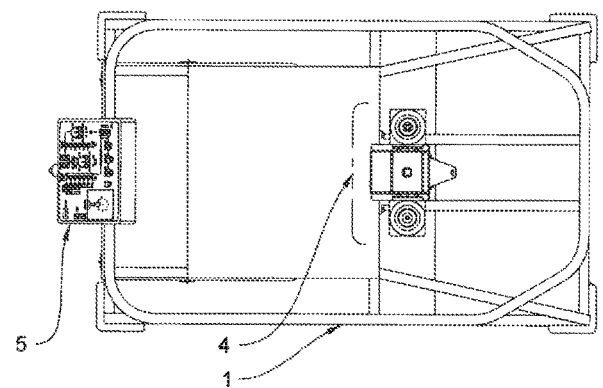
FIG. 5
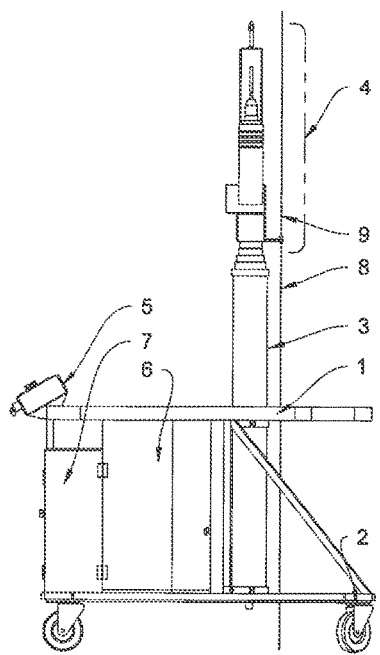 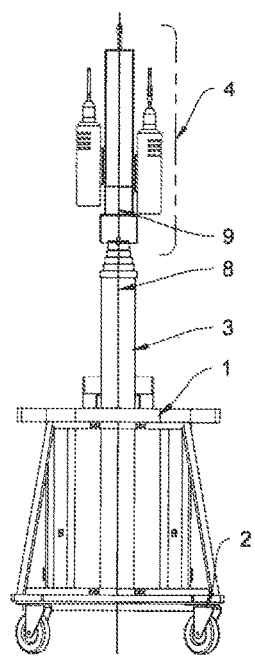 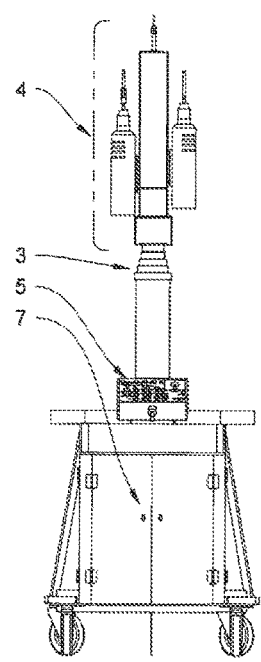
FIG. 2　　FIG. 3　　FIG. 4

OVERHEAD DRILL AND ANCHOR PRESS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of Invention

The present invention pertains to power tools used in the field of construction, particularly a composition of tools onto a single mobile mechanism needed for installation of anchors into concrete and/or non-concrete surfaces overhead out of reach of the installer.

The Prior Arts

In the field of construction, the conventional method of installing anchors overhead would start with elevating a person to within reach of the surface for the anchor to be installed. Outfitted with the proper personal protective equipment, the installer would use a drill and drill bit capable of penetrating the surface to a prescribed depth, followed by installing the anchor, and using another set of tools to properly set the anchor before attaching the load. This activity is generally performed a large number of times on a project resulting in tremendous stress and strain on a worker's muscles, joints, and tendons, resulting in unsafe conditions and loss of time and production due to fatigue and injuries.

BRIEF SUMMARY OF THE INVENTION

The primary purpose of this invention is to provide an operator with a tool that can install an anchor into a surface which is out of reach above the operator's head. This invention is designed to carry all of the necessary equipment needed for this installation process and easily move between target locations. The Overhead Drill and Anchor Press is designed to execute its install sequence automatically or manually with an on board controller.

The installation of an anchor generally requires a layout of locations which is easily done along the floor placing a mark where the anchor is to be located above. The Overhead Drill and Anchor Press is equipped with a laser that points down (for aligning to a mark on the floor) and up respectively to show that place on the surface above.

The Overhead Drill and Anchor Press has a telescopic mast which is designed to extend straight up carrying the tools needed for drilling a hole and pressing and setting the anchor. The telescopic mast is extended by pressing air from the reservoir tank, stored on the cart, and lowered by releasing the air back out of the mast. This operation is one of the sequencing steps initiated by the controller.

The present invention is equipped with a turret mounted to the top of the telescopic mast which operates the 2 drills attached to either side and is equipped with a laser and a camera. The first drill is loaded with the appropriate drill bit and programmed for drilling into the surface. The second drill is loaded with the appropriate setting tool and anchor, and programmed to press the anchor into the hole and set the anchor by rotatory torque or percussion depending on the requirements of the anchor.

The cart is equipped with casters for easy movement and is compartmentalized for protection of the power supply system and the air tank system with a sturdy top and floor base for carrying a supply of anchors needed for the project.

BRIEF DESCRIPTION OF THE SEVERAL VIEWS OF THE DRAWINGS

FIG. 2 is an elevation view of the right side of the overhead drill and anchor press.

FIG. 3 is an elevation view of the front of the overhead drill and anchor press.

FIG. 4 is an elevation view of the back of the overhead drill and anchor press.

FIG. 5 is a plan view of the top of the overhead drill and anchor press.

FIG. 8C is the controller unit symbol legend.

DETAILED DESCRIPTION OF THE INVENTION

The present invention will be apparent to those skilled in the art by reading the following detailed description of preferred embodiments thereof, with reference to the attached drawings.

Figure 1A:
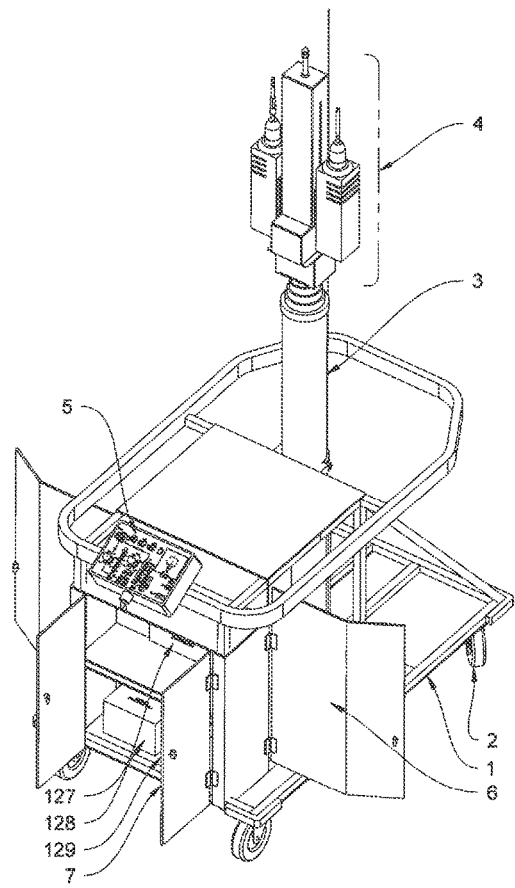
FIG. 1A is an isometric view with the compartment doors in the open position. View is looking at the right rear.
Figure 1B:
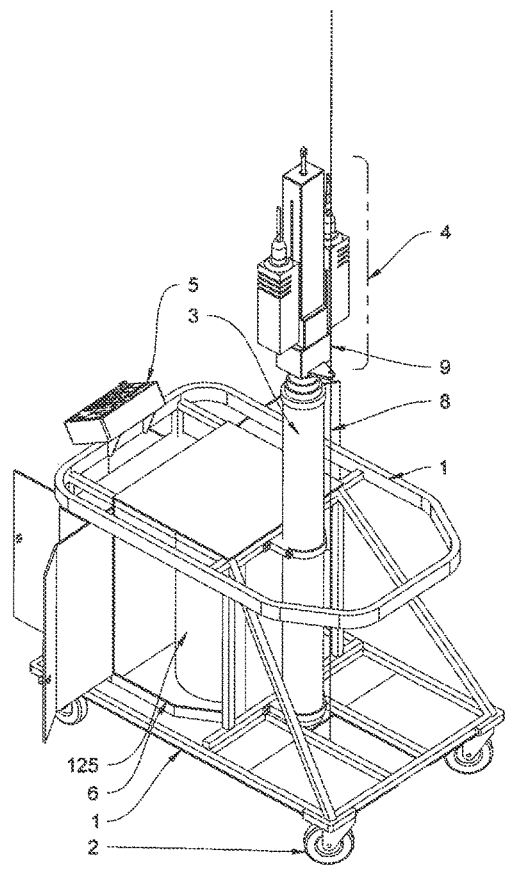
FIG. 1B is an isometric view with the compartment doors in the open position. View is looking at the right front.

FIG. 1A and FIG. 1B are isometric views showing the preferred embodiment of the overhead drill and anchor press and includes these major components: a compartmentalized cart on casters 1, a telescopic mast 3, a turret assembly 4, a controller 5, an air reservoir tank 125, a battery 128, a battery charger 129, and a DC power supply 127. The entire assembly of the embodiment of the overhead drill and anchor press is designed to be manually pushed between target locations and sized to fit through standard framed door openings on a construction project.

Figure 6:
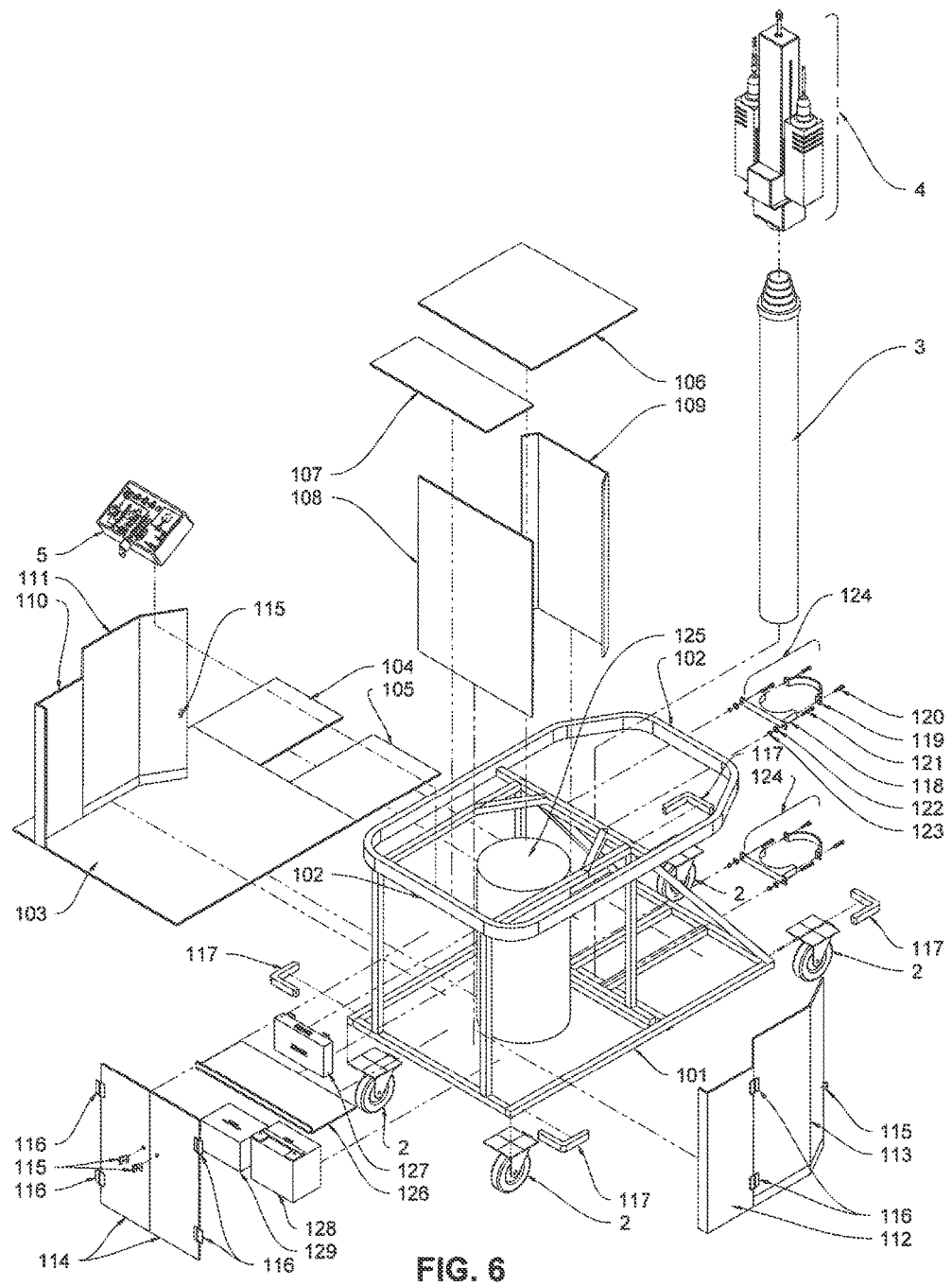
FIG. 6 is an exploded view of the preferred embodiment of the overhead drill and anchor press.

FIG. 6 is an exploded view of the preferred embodiment of the Overhead Drill and Anchor Press of the present invention. This view illustrates the exploded components of the cart and placement of the major components: the telescopic mast 3, the turret assembly 4, the controller 5, the air reservoir tank 125, the battery 128, the battery charger 129, and the DC power supply 127. The cart chassis framing 101 is wielded light weight metal and offers the support to all before mentioned major components. The cart handrail 102 is wielded to the cart chassis framing 101. The cart handrail 102 has rounded corners for handling and is shaped so that the controller 5 may be placed at any location along the straight sections (see FIG. 8A controller bracket 501). The casters 2 are heavy duty, swivel, polyurethane and wielded to the chassis framing 101. The rubber bumpers 117 are attached for protection of the operator's ankles and surrounding construction objects that the cart 1 may come in contact with. Each of the cart floor panels 103, 104, 105, and compartment top panels 106, 107, are constructed of light weight material strong enough to support objects placed on them and are affixed to the cart chassis framing 101. A gap is left between cart floor front left 104 and cart floor front right 105 so that the laser down 8 (FIG. 2) may pass the cart 1 to the floor for targeting. Each of the compartment panels 108, 109, 110, 111, 112, are constructed of strong light weight material and affixed to the cart chassis framing 101.

In FIG. 6 of the present invention the telescopic mast 3 is secured to the cart chassis framing 101 by first attaching the two mast clamp back plates 118, setting the telescopic mast 3 in place and completing the mast clamp assembly 124 by bolting in place the two mast clamp front plates 119.

The preferred embodiment of overhead drill and anchor press includes these powered components: [(FIG. 6) controller 5, DC power supply 127], [(FIG. 7A) servo motor#1 401, servo motor#2 402, servo motor#3 403, drill #1 430, drill #2 434, laser 413, and turret mounted camera (not shown in attached drawings)]. The above listed components are powered by the (FIG. 6) DC power supply 127, which draws its power from the (FIG. 6) battery 128 (wire and wiring connections are not shown in the attached drawings). The battery 128 is charged by the battery charger 129, which is plunged into a standard outlet for charging.

Figure 7:
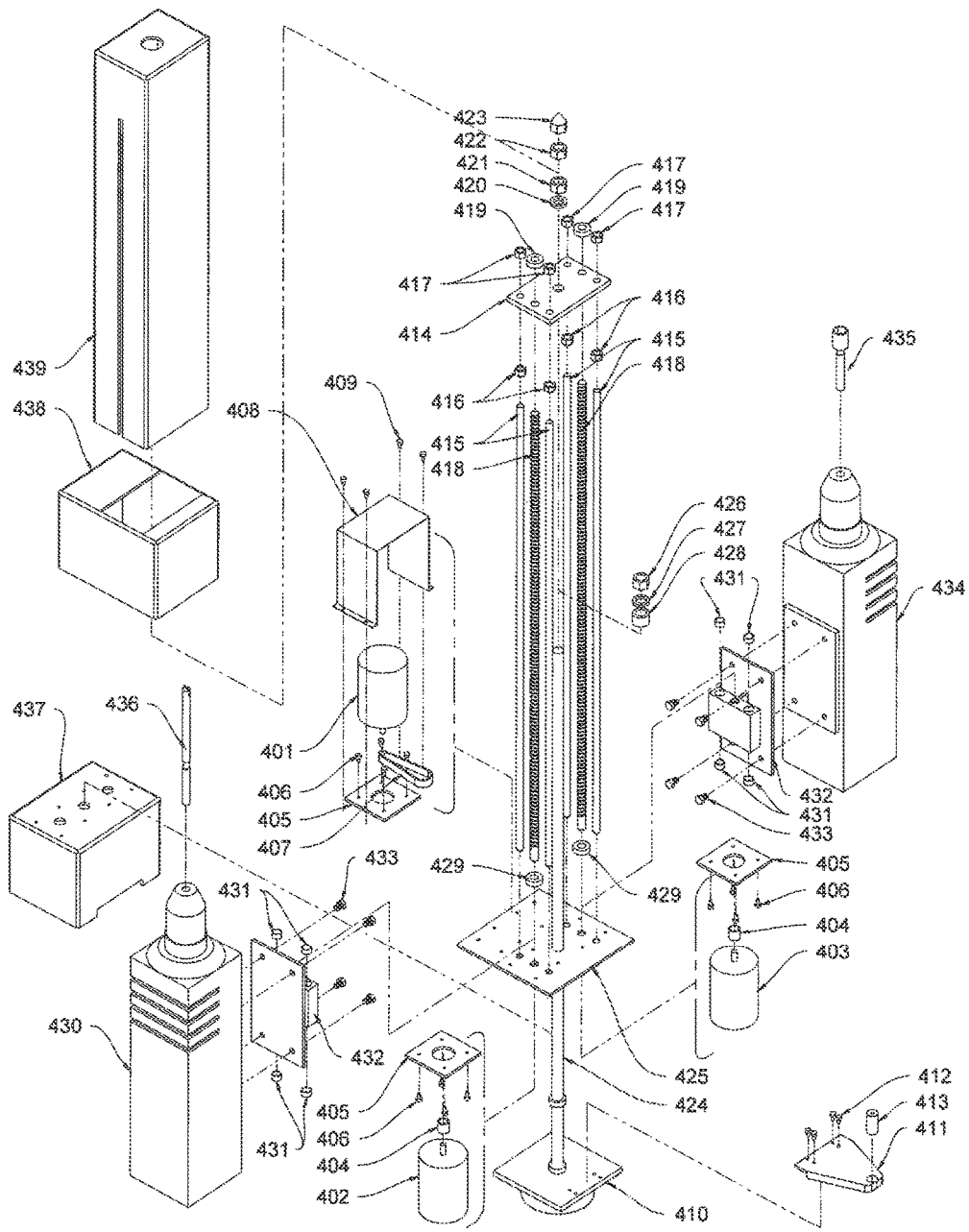
FIG. 7 is an exploded view of the preferred embodiment of the turret component to the overhead drill and anchor press.

FIG. 7A is and exploded view of the preferred embodiment of the turret component to the overhead drill and anchor press. The main shaft 424 has a solid connection to the main shaft mounting plate 410. The base plate 425 and all components mounted to it are designed to rotate around the main shaft 424. The linear guide shafts 415 are solid mounted to the base plate 425 with a threaded top for attaching the top plate 414. The ball screws 418 are held in place to the base plate 425 through the ball screw bearing 429 and the top plate 414 with the ball screw lock nut. The holes in the top plate 414 that receive the ball screws 418 are bearinged for ball screw 418 rotation.

In FIG. 7A the belt 407 is placed around the main shaft 424 and the shaft of the servo motor #1 401. (The belt connection between the main shaft 424 and the servo motor #1 401 may also be achieved through gears in lieu of a belt). This servo motor#1 401 is affixed to the base plate 425 (with a protection housing 408 affixed above it) turns the base plate 425 about the main shaft 424 for positioning of the drills during operation.

The servo motor #2 402 and servo motor #3 403 are affixed to the base plate 425 and connected to their respective ball screw 418 with a shaft coupling 404. The ball screw 418 drives the carrier 432 which has a threaded hole in the center and two sets of linear bearings (carrier bearings 431) pressed into the carriers 432 for smooth linear movement along the linear guide shafts 415.

The two drills, drill #1 430 and drill #2 434, are standard drills capable of these functions separately: drill, hammer, and hammer drill. These drills have no handle but have been designed to attached to the carriers 432 and have a plug for wiring connection to the controller thru the cord 503 see FIG. 8A, FIG. 8B (wire and wiring connections are not shown in the attached drawings).

In FIG. 7A of the present invention the turret component has three sections of protective cover constructed of light weight material designed to keep dust and debris out of the moving parts of this assembly. The turret top cover 439 is one piece with an opening on either side to allow for the carriers 432 to travel up and down. The turret base upper cover 438 and turret base lower cover 437 can be split into two sections for securing to base plate 425.

Figure 8A:
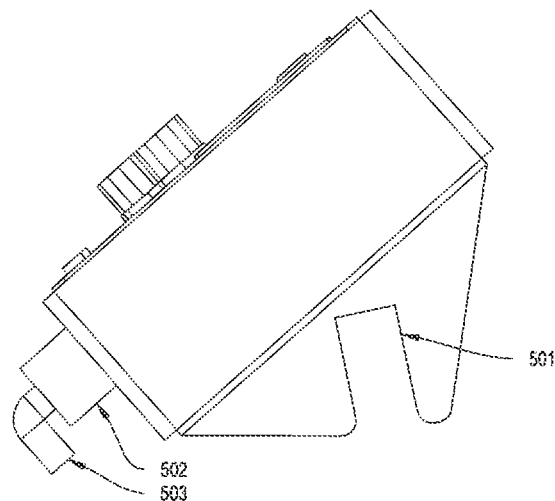
FIG. 8A is an enlarged side view of the preferred embodiment of the controller unit to the overhead drill and anchor press.
Figure 8B:
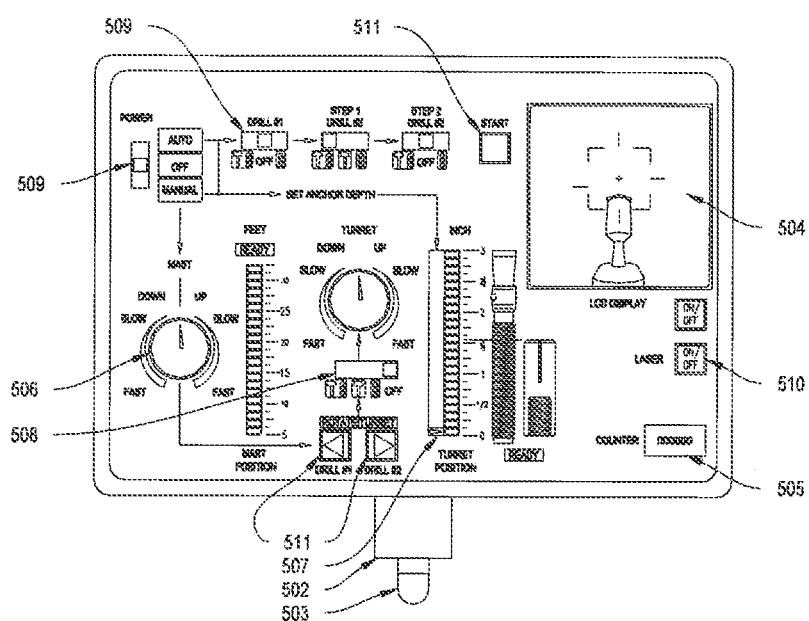
FIG. 8B is an enlarged top view of the preferred embodiment of the controller unit of the overhead drill and anchor press.
Figure 11:
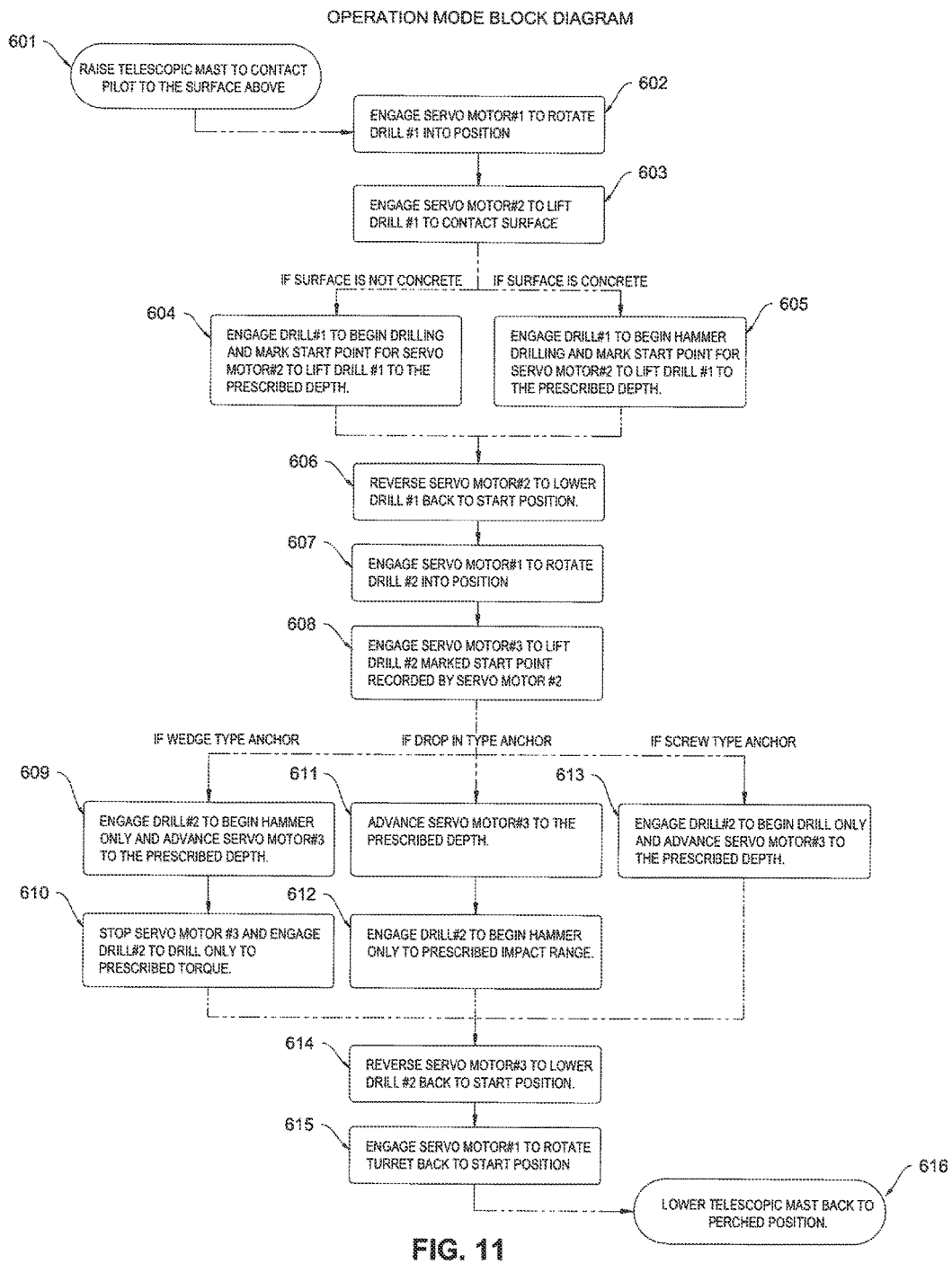
FIG. 11 is the operation mode block diagram of the operating sequence for the overhead drill and anchor press.

FIGS. 8A and 8B the overhead drill and anchor press is equipped with a controller capable of selecting between automatic mode and manual mode. In either mode the operator may select each drill's operating mode based on the type of surface and anchor type to be installed. If the operator has selected AUTO mode then the operator will need to make the selections for both drill operations and the anchor depth (with the slide switch 507) before pressing the start button 511. FIG. 8C is the symbol legend for the controller. FIG. 11 is the operation mode block diagram which illustrates the sequence of operations programmed to the controller in AUTO mode.

FIG. 8B the controller also has the manual mode selection. If the operator selects the manual mode, then the operator will need to process each sequence using the rotary switches 506, selector switch 508, and momentary switches 511. FIG. 11 is the operation mode block diagram which illustrates the sequence of operations that will be controlled manually with the controller in MANUAL mode.

Figures 9A, 9B:
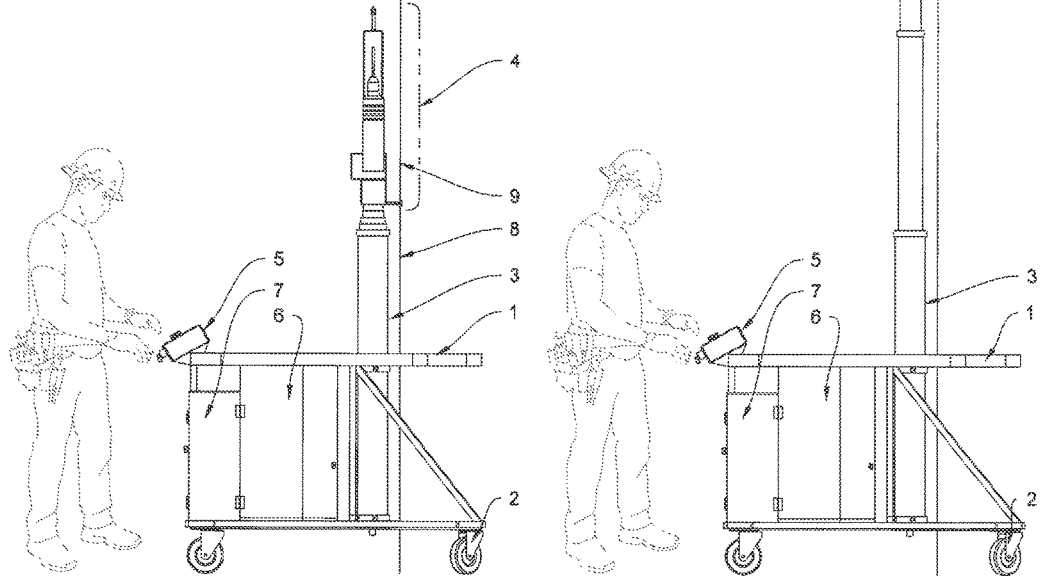
FIG. 9A is an elevation view of the right side of the overhead drill and anchor press in operation mode at the perched position with the laser on for sighting the target.
FIG. 9B is an elevation view of the right side of the overhead drill and anchor press in operation mode "sequence 1" showing the mast extended to contact the pilot tip to the construction surface above.

FIG. 9A is an elevation view of the right side of the overhead drill and anchor press in operation mode at the perched position with the laser on for sighting the target. FIG. 9B is an elevation view of the right side of the overhead drill and anchor press in operation mode "sequence 1" showing the mast extended to contact the pilot tip to the construction surface 10 above.

Figure 10A:
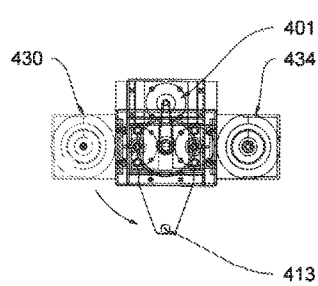
FIG. 10A is an enlarged top view of the turret in operation mode in the turret start position with the laser in position of the target.
Figure 10B:
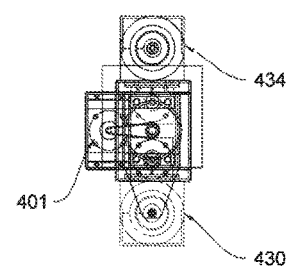
FIG. 10B is an enlarged top view of the turret in operation mode at "sequence 2" with the drill #1 in position of the target.
Figure 10C:
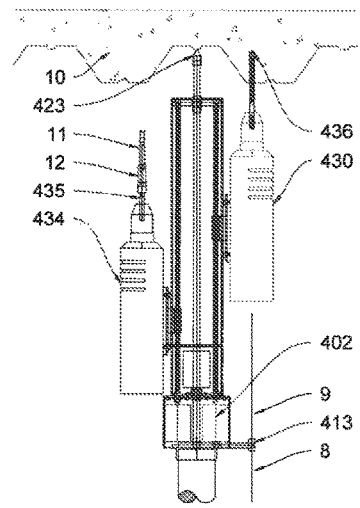
FIG. 10C is an enlarged elevation view of the right side in operation mode at "sequence 4" with the drill #1 advanced into the prescribed drilling depth of the surface.
Figure 10D:
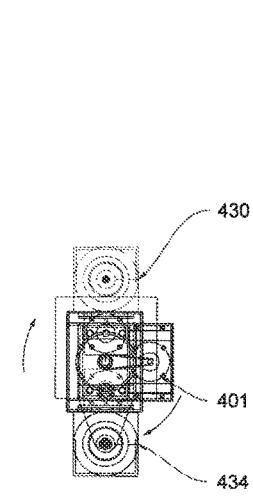
FIG. 10D is an enlarged top view of the turret in operation mode at "sequence 6" with the drill #2 in position of the target.
Figure 10E:
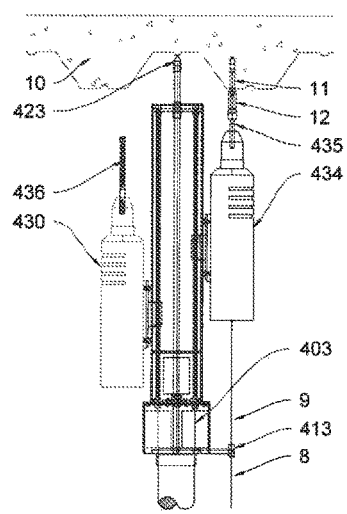
FIG. 10E is an enlarged elevation view of the right side in operation mode at "sequence 8.1" with the drill #2 and anchor advanced into the prescribed depth of the surface.
Figure 10F:
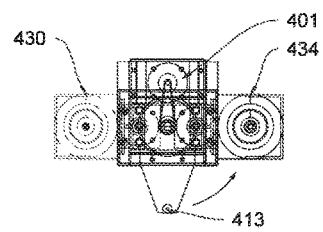
FIG. 10F' is an enlarged top view of the turret in operation mode at "sequence 10" rotated back to the start position with the laser in position of the target.

FIG. 10A is an enlarged top view of the turret in operation mode in the turret start position with the laser in position of the target. FIG. 10B is an enlarged top view of the turret in operation mode at "sequence 2" with the drill #1 in position of the target. FIG. 10C is an enlarged elevation view of the right side in operation mode at "sequence 4" with the drill #1 advanced into the prescribed drilling depth of the surface. FIG. 10D is an enlarged top view of the turret in operation mode at "sequence 6" with the drill #2 in position of the target. FIG. 10E is an enlarged elevation view of the right side in operation mode at "sequence 8.1" with the drill #2 and anchor advanced into the prescribed depth of the surface. FIG. 10F is an enlarged top view of the turret in operation mode at "sequence 10" rotated back to the start position with the laser in position of the target. FIG. 11 is the operation mode block diagram of the operating sequence for the overhead drill and anchor press. The above described FIGS. 10A, B, C, D, E, and F can be referenced to FIG. 11 Operation mode block diagram.

The preferred embodiment described above is disclosed for illustrative purpose but to limit the modifications and variations of the present invention. Thus, any modifications and variations without departing from the spirit and scope of the invention should still be covered by the scope of this invention as disclosed in the accompanying claims.

What is claimed is:

1. An overhead drill and anchor press, comprising:
a controller;
a frame;
a telescopic mast connected to and supported by the frame, the telescopic mast being configured to selectively move vertically between a down position and one of a plurality of raised positions;
a turret attached to an upper portion of the telescopic mast, the turret having a main shaft;
a first drill connected to a first portion of the turret and a second drill connected to a second portion of the turret;
a first motor connected to the main shaft of the turret which when activated by the controller causes the turret and the first and second drills to selectively rotate between different rotational positions;
a second motor configured to move the first drill vertically between a lowered position and a raised position; and
a third motor configured to move the second drill vertically between a lowered position and a raised position,
wherein the controller is configured to control the telescopic mast to move the telescopic mast to position the turret adjacent to a surface to be drilled, to control the second motor to raise the first drill to a drilling position of the surface to be drilled, to control the first drill to drill a hole in the surface, to control the second motor to lower the first drill away from the surface, to control the first motor to rotate the turret to position the second drill below the drilled hole in the surface, to control the third motor to raise the second drill to the hole drilled in the surface, and to control the second drill to set an anchor in the drilled hole in the surface.

2. The overhead drill and anchor press of claim 1, further comprising a belt connecting the first motor to the main shaft.

3. The overhead drill and anchor press of claim 1, further comprising a first linear actuating ball screw assembly connected between the first drill and the second motor, and a second linear actuating ball screw assembly connected between the second drill and the third motor.

4. The overhead drill and anchor press of claim 1, further comprising a laser disposed on a side of the turret, the laser configured to point a laser beam at the drilling position in the surface.

5. The overhead drill and anchor press of claim 4, wherein the laser is further configured to point the laser beam at a floor position below the overhead drill and anchor press for positioning the overhead drill and anchor press relative to the floor.

6. The overhead drill and anchor press of claim 1, wherein the first motor, the second motor and the third motor are servo motors.

7. The overhead drill and anchor press of claim 1, further comprising a DC power supply that supplies power to the controller and to the first motor, the second motor and the third motor.

8. The overhead drill and anchor press of claim 1, further comprising a pilot tip extending from an upper portion of the turret, the pilot tip configured to contact the surface.

9. The overhead drill and anchor press of claim 1, further comprising an air tank reservoir configured to transfer air into and out of the telescopic mast to pneumatically raise and lower the telescopic mast.

10. The overhead drill and anchor press of claim 1, further comprising a camera configured to generate images of an area around the surface to be drilled.

11. An overhead drill and anchor press, comprising:
a controller;
a frame;
a telescopic mast connected to and supported by the frame, the telescopic mast being configured to selectively move vertically between a down position and one of a plurality of raised positions; and
a turret attached to an upper portion of the telescopic mast, the turret having a main shaft, a first drill disposed on a first side of the turret and a second drill disposed on a second side of the turret, the turret being configured to, under control by the controller, selectively rotate the first drill and the second drill about the main shaft and to selectively independently raise and lower the first and second drills to position the first and second drills for drilling,
wherein the controller is configured to control the telescopic mast to move the telescopic mast to position the turret adjacent to a surface to be drilled, to control the turret to raise the first drill to a drilling position of the surface to be drilled and to drill a hole in the surface, to control the turret to lower the first drill away from the surface, to control the turret to rotate the turret to position the second drill below the drilled hole in the surface, to control turret to raise the second drill to the hole drilled in the surface and to set an anchor in the drilled hole in the surface.

12. The overhead drill and anchor press of claim 11, further comprising a laser disposed on a side of the turret, the laser configured to point a laser beam at the drilling position in the surface.

13. The overhead drill and anchor press of claim 12, wherein the laser is further configured to point the laser beam at a floor position below the overhead drill and anchor press for positioning the overhead drill and anchor press relative to the floor.

14. The overhead drill and anchor press of claim 11, further comprising a pilot tip extending from an upper portion of the turret, the pilot tip configured to contact the surface.

15. The overhead drill and anchor press of claim 11, further comprising an air tank reservoir configured to transfer air into and out of the telescopic mast to pneumatically raise and lower the telescopic mast.

16. The overhead drill and anchor press of claim 11, further comprising a camera configured to generate images of an area around the surface to be drilled.

* * * * *